(12) United States Patent
Boester

(10) Patent No.: US 9,043,999 B1
(45) Date of Patent: Jun. 2, 2015

(54) BOWFISHING REEL

(71) Applicant: Bear Archery Incorporated, Evansville, IN (US)

(72) Inventor: Theodore J. Boester, Newburgh, IN (US)

(73) Assignee: Bear Archery Incorporated, Evansville, IN (US)

( * ) Notice: Subject to any disclaimer, the term of this patent is extended or adjusted under 35 U.S.C. 154(b) by 201 days.

(21) Appl. No.: 13/957,508

(22) Filed: Aug. 2, 2013

Related U.S. Application Data

(60) Provisional application No. 61/679,142, filed on Aug. 3, 2012.

(51) Int. Cl.
*A01K 89/01* (2006.01)
*A01K 89/02* (2006.01)

(52) U.S. Cl.
CPC ..................................... *A01K 89/02* (2013.01)

(58) Field of Classification Search
CPC ..... F41B 5/1484; F41B 5/1488; A01K 89/08; A01K 91/02
USPC ............... 242/323; 43/6, 19, 20; 124/23.1, 25
See application file for complete search history.

(56) References Cited

U.S. PATENT DOCUMENTS

| | | | |
|---|---|---|---|
| 4,383,516 A * | 5/1983 | La See | 124/88 |
| 4,674,471 A * | 6/1987 | Lance | 124/86 |
| 4,726,348 A * | 2/1988 | Saunders | 124/23.1 |
| 6,517,453 B2 | 2/2003 | La See | |
| 6,634,350 B2 | 10/2003 | LaSee | |
| 2003/0136870 A1* | 7/2003 | Braun | 242/360 |
| 2003/0140912 A1* | 7/2003 | LaSee | 124/86 |
| 2009/0183720 A1* | 7/2009 | Hudkins | 124/44.5 |
| 2011/0005120 A1* | 1/2011 | de Koning et al. | 43/19 |
| 2011/0240811 A1* | 10/2011 | Soderberg | 248/222.14 |
| 2012/0042863 A1* | 2/2012 | Smith et al. | 124/87 |
| 2012/0285430 A1* | 11/2012 | Dunlop et al. | 124/23.1 |

\* cited by examiner

*Primary Examiner* — Emmanuel M Marcelo
(74) *Attorney, Agent, or Firm* — Woodard, Emhardt, Moriarty, McNett & Henry LLP

(57) ABSTRACT

Disclosed is a bowfishing reel that includes a first wheel, a second wheel that can be moved into contact with the first wheel to pinch a fishing line between the wheels, a biasing mechanism that bias the second wheel toward the first wheel with a biasing force sufficient to grip the fishing line between the wheels, an actuator arranged to move the second wheel away from the first wheel against the biasing force, a latch that can independently hold and retain the second wheel away from the first wheel against the biasing force, and a trigger mechanism that can controllably release the latch from holding the second wheel away from the first wheel to allow the biasing mechanism to bias the second wheel into contact with the first wheel to pinch the fishing line between the first and second wheels.

20 Claims, 9 Drawing Sheets

US 9,043,999 B1

BOWFISHING REEL

CROSS REFERENCE TO RELATED APPLICATIONS

The present application claims the benefit of U.S. Provisional Patent Application Ser. No. 61/679,142 filed Aug. 3, 2012, which is incorporated by reference.

FIELD OF THE INVENTION

The present invention relates generally to archery bows and more particularly pertains to a bowfishing reel lever locking arrangement for use with and mountable to archery bows.

BACKGROUND

Certain archery bows are used for bowfishing. In such arrangements, a fishing line is attached to an arrow and the line is paid out from a reel arrangement on the bow when the arrow is shot. After the arrow is shot, the reel arrangement can be used to draw the line and arrow back towards the bow.

SUMMARY

Embodiments of the present disclosure include a bowfishing reel lever locking arrangement for use with an archery bow. In certain embodiments the reel and lever are cocked before or when the bow is drawn and locked in an open position during release of an arrow, allowing a fishing line to freely be paid out as the arrow travels from the bow. After the arrow and fishing line are paid out, rotation of the reel handle unlocks the lever, allowing the lever and a pinch roller to bear against a reel wheel, enabling the reel wheel and pinch roller to engage and, when turned, to pull the line and arrow back towards the bow.

Other objects and attendant advantages will be readily appreciated as the same become better understood by references to the following detailed description when considered in connection with the accompanying drawings.

DESCRIPTION OF THE ILLUSTRATED EMBODIMENTS

For the purposes of promoting an understanding of the principles of the disclosure, reference will now be made to the embodiments illustrated and specific language will be used to describe the same. It will nevertheless be understood that no limitation of the scope of the disclosure is thereby intended, such alterations, modifications, and further applications of the principles being contemplated as would normally occur to one skilled in the art to which the disclosure relates.

Embodiments of the present disclosure include a bowfishing reel lever locking arrangement for an archery bow. In certain embodiments the reel and lever are cocked before or when the bow is drawn and locked in an open position during release of an arrow, allowing a fishing line to freely be paid out as the arrow travels from the bow. After the arrow and fishing line are paid out, rotation of the reel handle unlocks the lever, allowing a pinch roller to bear against a reel wheel, enabling the reel wheel and pinch roller to engage and pull the line and arrow back towards the bow.

Figure 1:
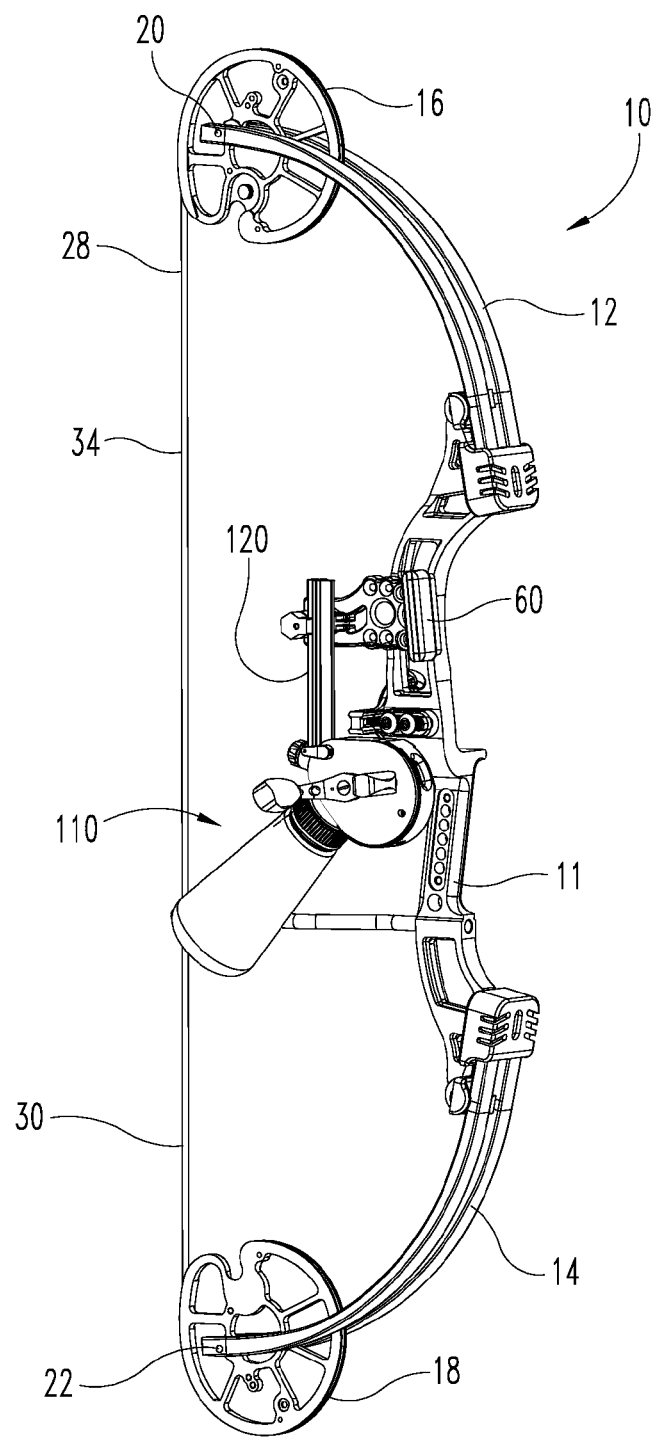
FIGS. 1 and 2 are perspective views of an archery bow in an undrawn position incorporating a bowfishing reel lever locking arrangement according to a preferred embodiment of the present disclosure.
Figure 2:
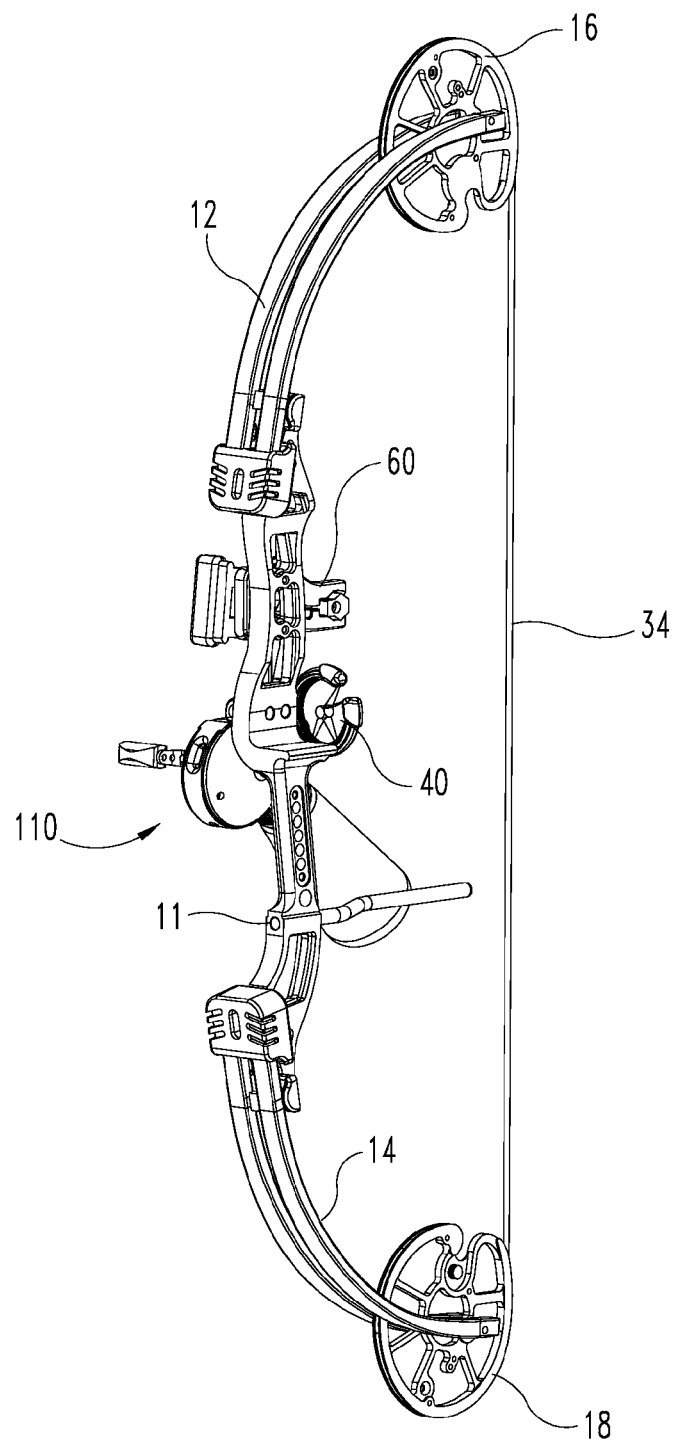

FIGS. 1 and 2 illustrate an example of a bowfishing reel arrangement 110 mounted on a conventional dual cam compound archery bow generally designated as 10. When viewed from the perspective of an archer holding the bow, it includes a riser 11 with a handle, an upper limb portion 12 and a lower limb portion 14 forming a bow body. A mounting bracket 60 adjustably connects the reel arrangement 110 to bow 10. In the dual cam bow example illustrated, rotational members such as cams 16 and cam 18 are supported at the limb tip sections for rotary movement about axles 20 and 22. In the embodiment shown, upper and lower limbs are formed of parallel and symmetric limb portions sometimes called quad limbs. Alternately, a single piece limb can have a notch or slot area removed to allow a rotational element to be mounted to the limb tip. An upper pulley axle 20 is carried between the outer limb tip portions of upper limb 12. A lower pulley axle 22 is carried between the outer limb tip portions of lower limb 14.

The portion of the cable which defines the bowstring cable 34 includes an upper portion 28 and a lower end portion 30 which are fed-out from cams 16 and 18 when the bow is drawn. The non-bowstring portions of the cable arrangement including return or cross cables extending between the cams and/or limb tips are not illustrated for ease of reference. Each cable has a thickness and one or more strands forming a round cross-section defining a circumference.

From the perspective of the archer, the bowstring is considered rearward relative to the riser which defines forward. Directional references herein are for ease of explanation and are not intended to be limiting. Similarly, a bow riser handle held with the left hand is illustrated, but is not intended to be limiting. A symmetric arrangement can be used with a bow having a right-handed riser.

When the bowstring 34 is drawn, it causes cams 16 and 18 at each end of the bow to rotate, feeding out cable and bending limb portions 12 and 14 inward, causing energy to be stored therein. When the bowstring 34 is released with an arrow engaged to the bowstring, the limb portions 12 and 14 return to their rest position, causing cams 16 and 18 to rotate in the opposite direction, to take up the bowstring 34 and launch the arrow with an amount of energy proportional to the energy initially stored in the bow limbs. Bow 10 is described for illustration and context and is not intended to be limiting.

Certain embodiments can also be used with single or hybrid cam compound bows. A single cam bow includes a similar riser with a handle, upper limb portions and lower limb portions. Rotational members such as an upper idler wheel and a lower eccentric cam are supported at the limb tip sections for rotary movement about their axles. A bowstring cable includes an upper end fed-out from the upper wheel and a lower end mounted to and fed-out from the lower cam when the bow is drawn. A return cable portion has an upper end wrapped around the upper cam and a lower end mounted to the lower cam, with the lower end fed-out from cam as the bow is drawn. Additionally, a y-yoke anchor cable has a lower end mounted to the lower cam and two upper ends mounted to the axle of the upper cam. The lower end is taken in to the lower cam as the bow is drawn. References herein to a bowstring or cable portion extending to the limb tips are intended to broadly include a cable portion wrapped around or mounted to a track of a rotational element or an attachment to an axle mounted at the limb tips.

The present disclosure can also be used in other types of bows, for example recurve, hybrid cam bows or crossbows, which are considered conventional for purposes of the present disclosure. For convenience, the combination of riser 11 and either single or quad limbs forming upper limb 12 and lower limb 14 may generally be referred to as an archery bow body. It should be appreciated that the archery bow body can take on various designs in accordance with the many different types of bows.

In the illustrated embodiments, reel assembly 110 is mounted to archery bow 10. A mounting bracket 120 forms a portion of the reel assembly and is adjustably coupled to a mounting bracket piece 60 which is secured to or extends from riser 11. Mounting bracket 60 may be fastened in place with screws, bolts, rivets, or similar connectors or may be integral with riser 11. Alternately, mounting bracket 120 could be directly connected to the riser. Preferably, the connection point of mounting bracket 120 can be vertically adjusted to arrange reel assembly 110 adjacent to an arrow rest 40 mounted on bow 10. As illustrated, the line channel output portion of the reel assembly is arranged at substantially the same height along riser 11 as an arrow rest 40, yet on the opposing side of the riser.

Figure 3:
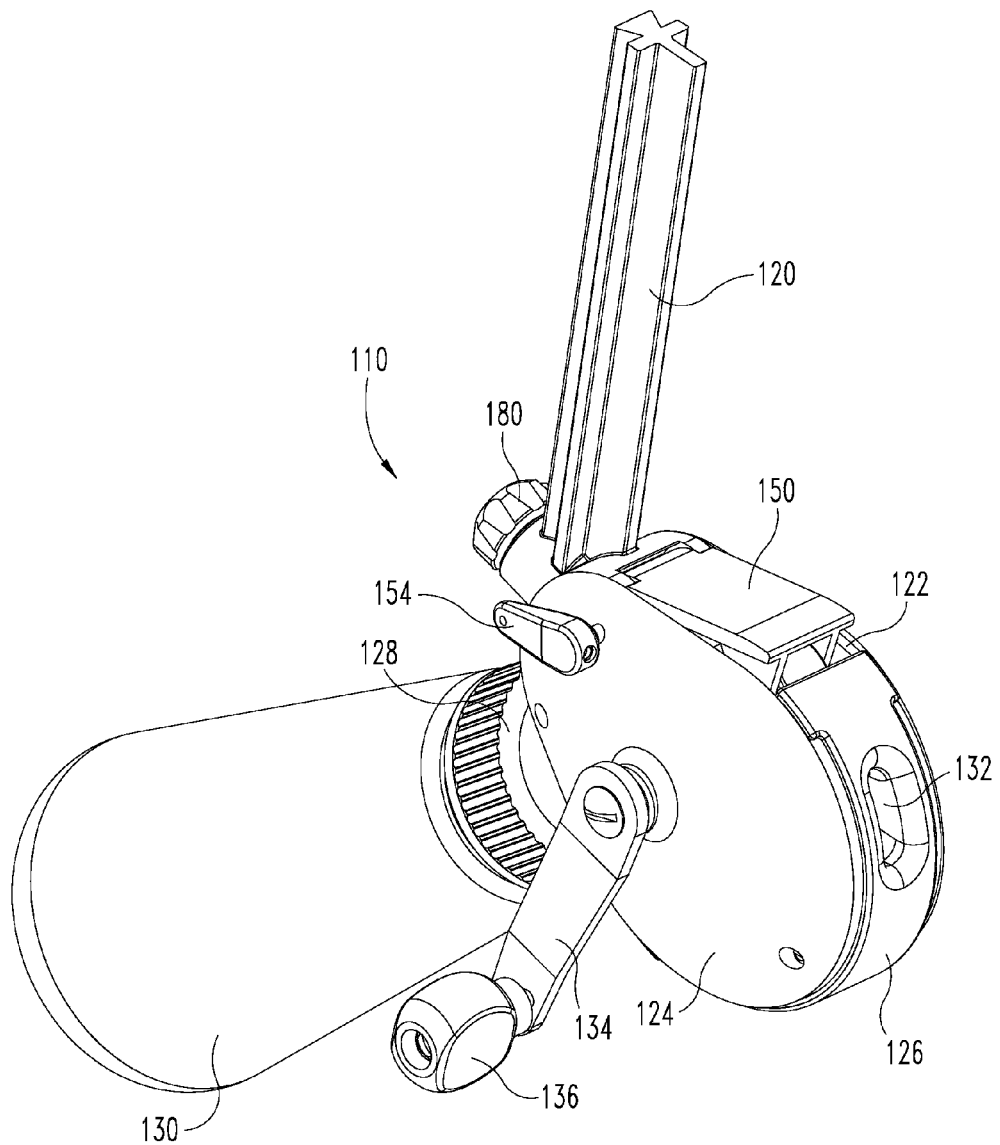
FIG. 3 is a perspective view of the bowfishing reel lever locking arrangement illustrated in FIGS. 1 and 2.
Figure 4:
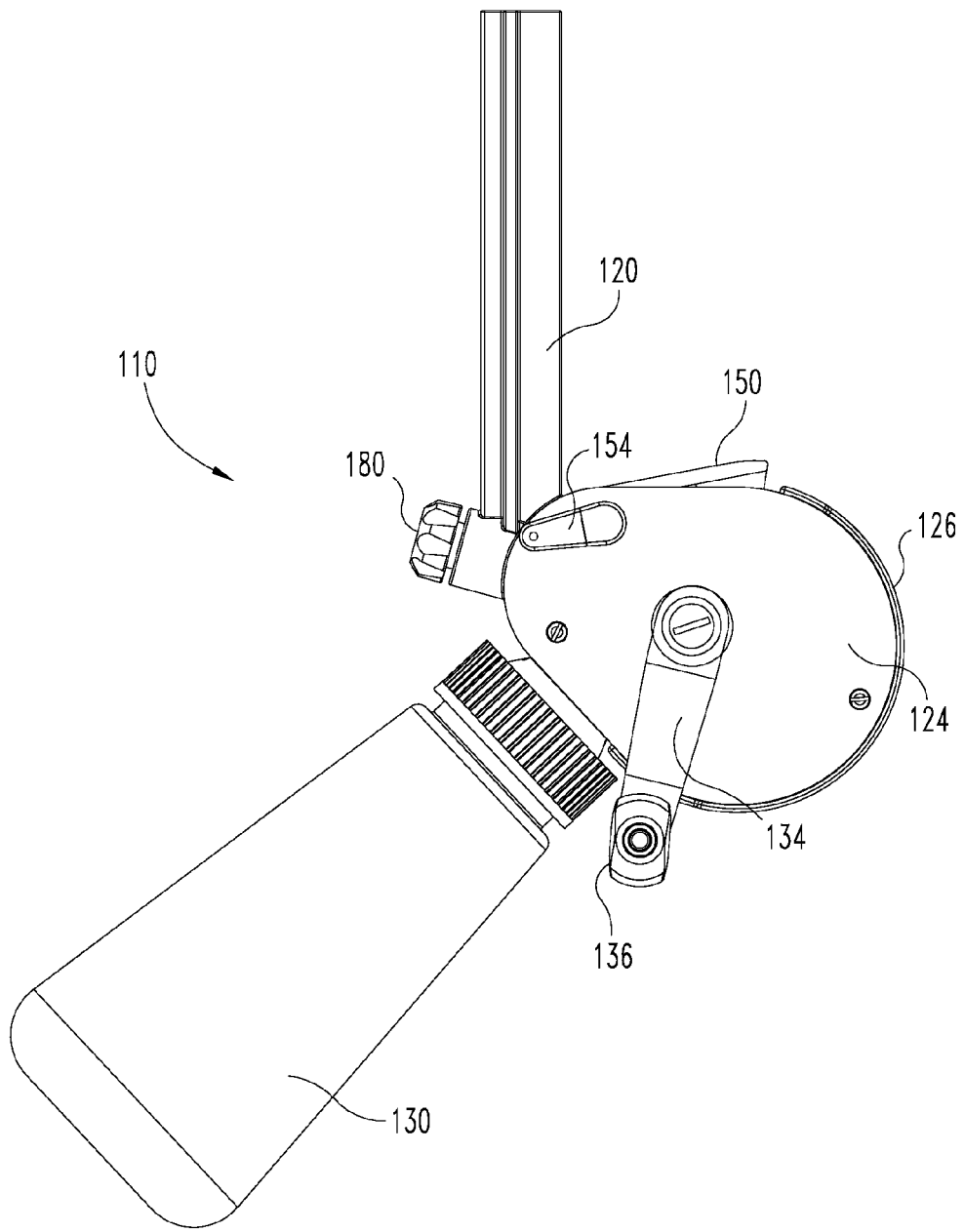
FIG. 4 is a right side view of the bowfishing reel lever locking arrangement of FIG. 3.
Figure 5:
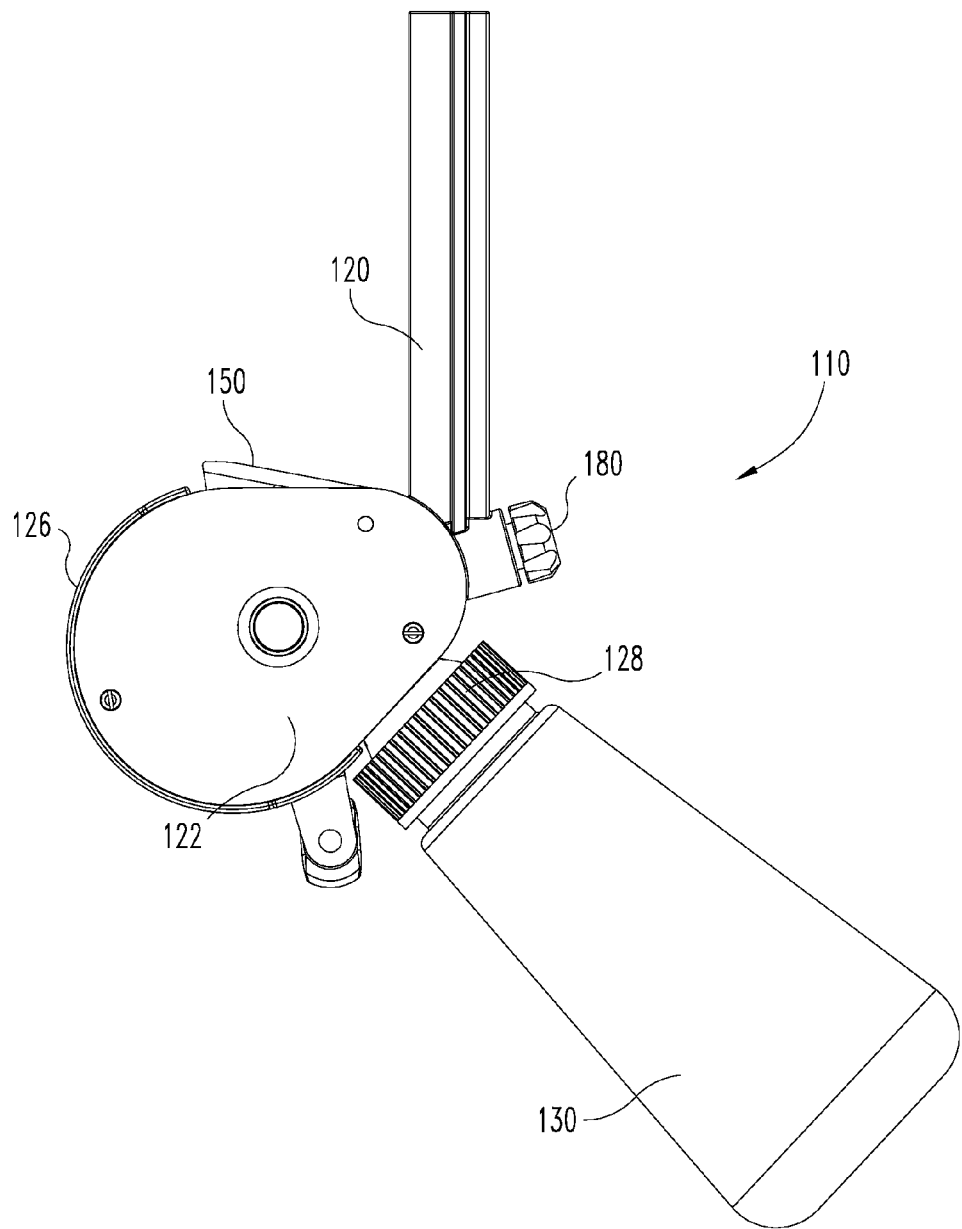
FIG. 5 is a left side view of the bowfishing reel lever locking arrangement of FIG. 3.

The exterior of reel assembly 110 includes a left cover 122, right cover 124, and front cover 126 assembled with mounting bracket 120 as illustrated in FIGS. 3-5. A bottle 130 is coupled to the reel assembly, for example, using a threaded bottle cap 128 on the lower side of the assembly. Bottle 130 is preferably arranged to loosely store a fishing line which extends through interior line channel 131 in the reel assembly and exits through a line channel output portion 132 to be connected to an arrow which can be shot from the bow. One end of the fishing line may be anchored to bottle 130. When an archer shoots the arrow from bow 10, the arrow preferably freely pulls the fishing line through the reel assembly during flight for the distance of the flight. After the arrow's flight has ended, reel assembly 110 may preferably be used to draw the line towards the reel assembly and back into bottle 130. A reel arm 134 and knob 136 mounted exterior to right cover 124 and extending into an interior reel gear are rotated by the archer to draw the line and arrow toward the bow.

Figure 6:
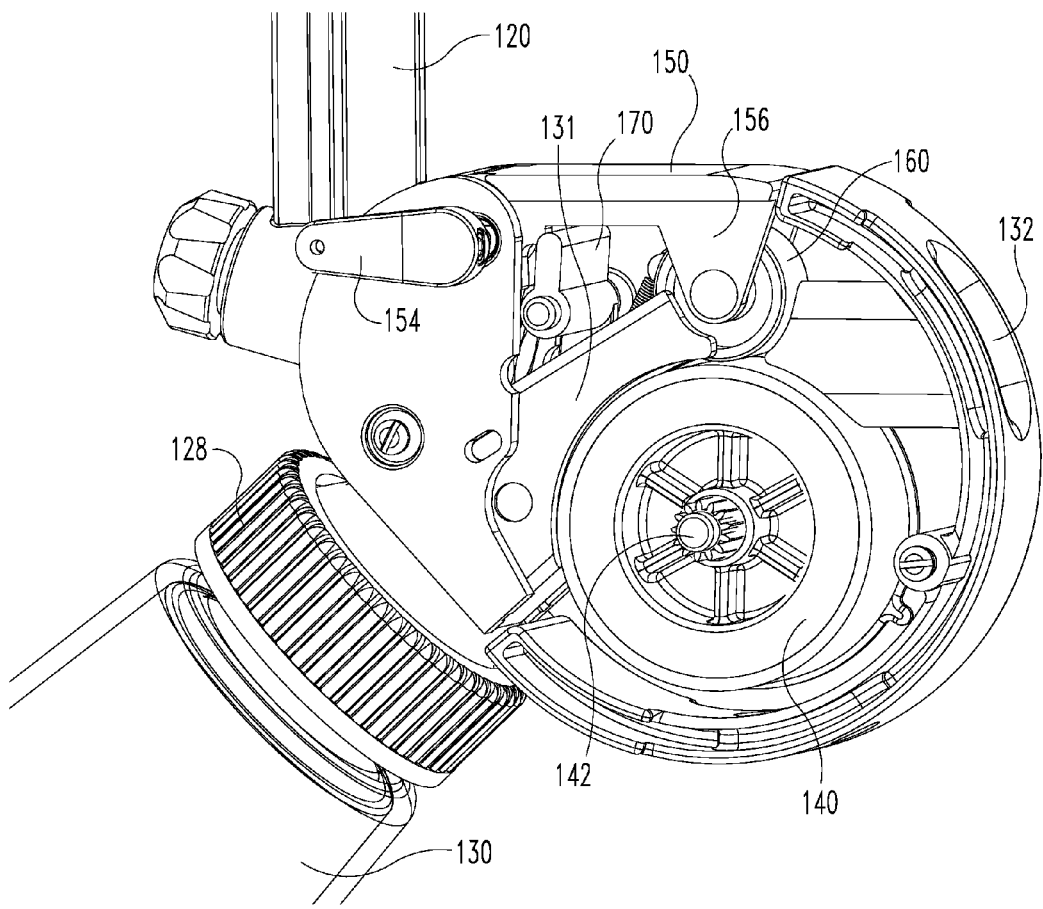
FIG. 6 is a right side interior view of the bowfishing reel lever locking arrangement of FIG. 3.

FIG. 6 illustrates an interior right side view of reel assembly 110 with the right cover, reel knob, reel arm, and reel gear not illustrated. FIG. 6 illustrates reel assembly 110 with lever 150 in the down or closed position with pinch wheel 160 pressed against wheel 140. A fishing line (not shown) extending through channel 131 and out through channel 132 would be pinched between pinch wheel 160 and wheel 140 in the closed position such that turning the reel arm and reel gear correspondingly turns gear 142 and wheel 140. Since the line is pinched, rotation of wheel 140 draws the line through the channels and back into bottle 130.

Figure 7:
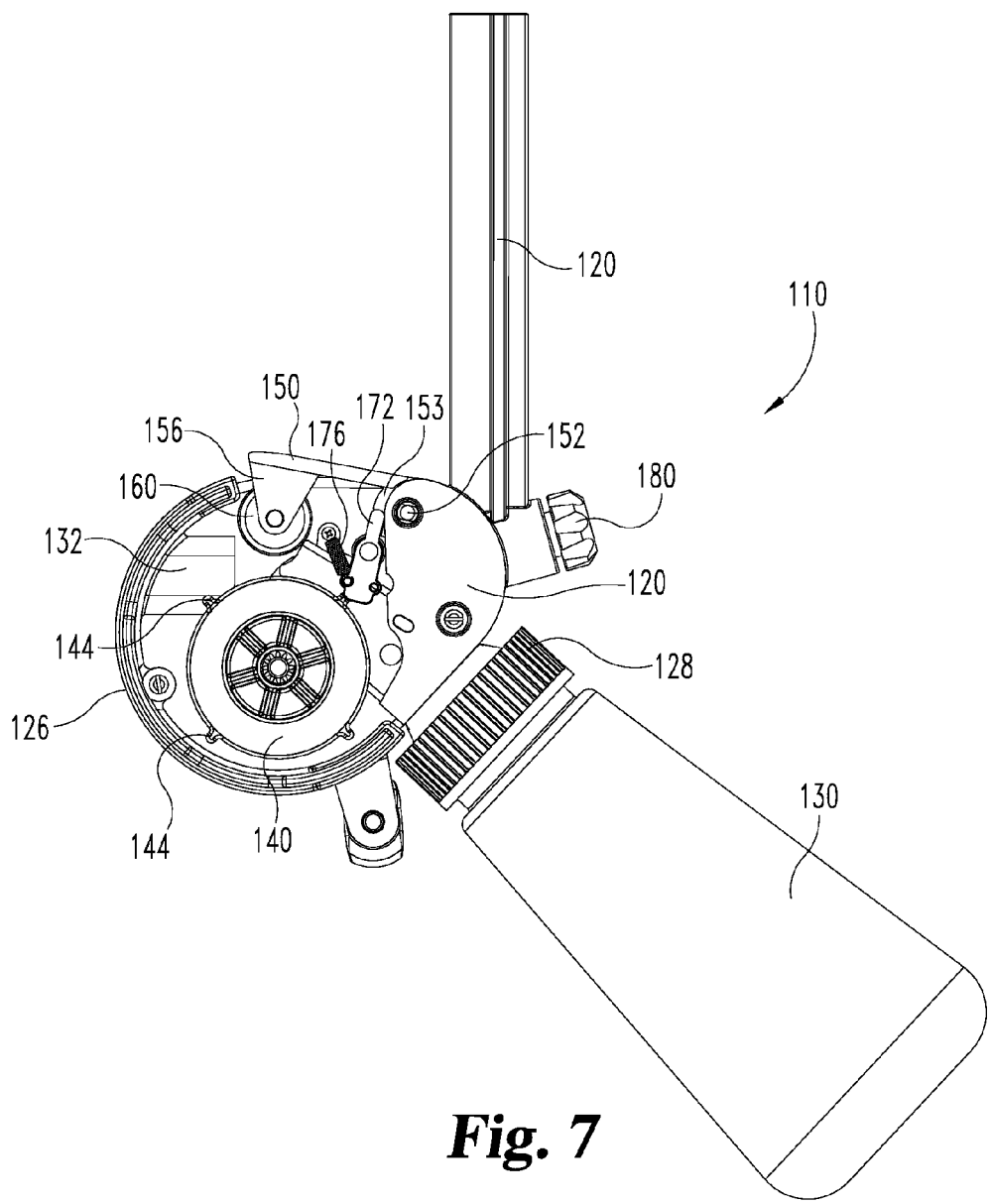
FIG. 7 is a left side interior view of the bowfishing reel lever locking arrangement of FIG. 3 with the locking lever in the open position.
Figure 8:
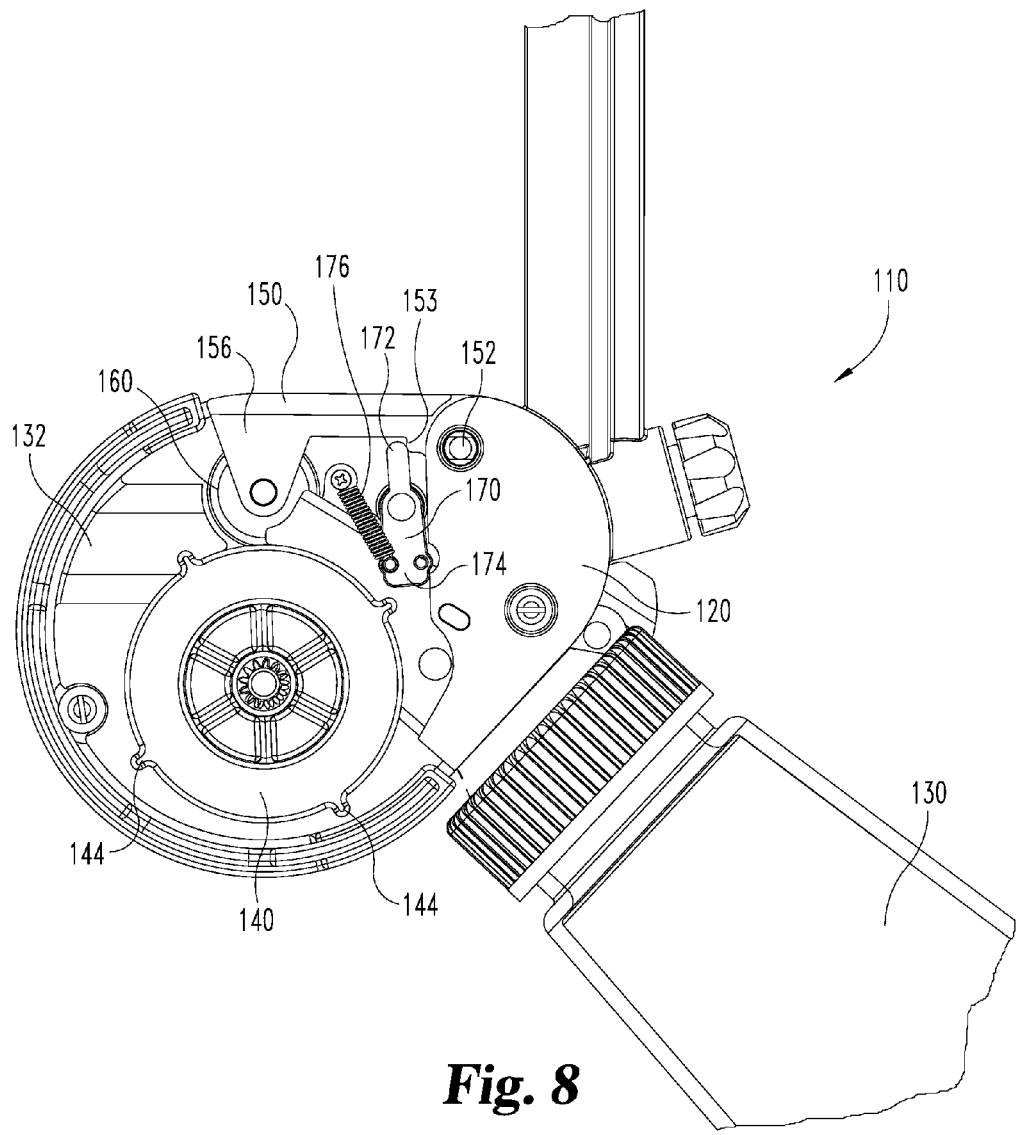
FIG. 8 is a left side interior view of the bowfishing reel lever locking arrangement of FIG. 3 with the locking lever in the closed position.
Figure 9:
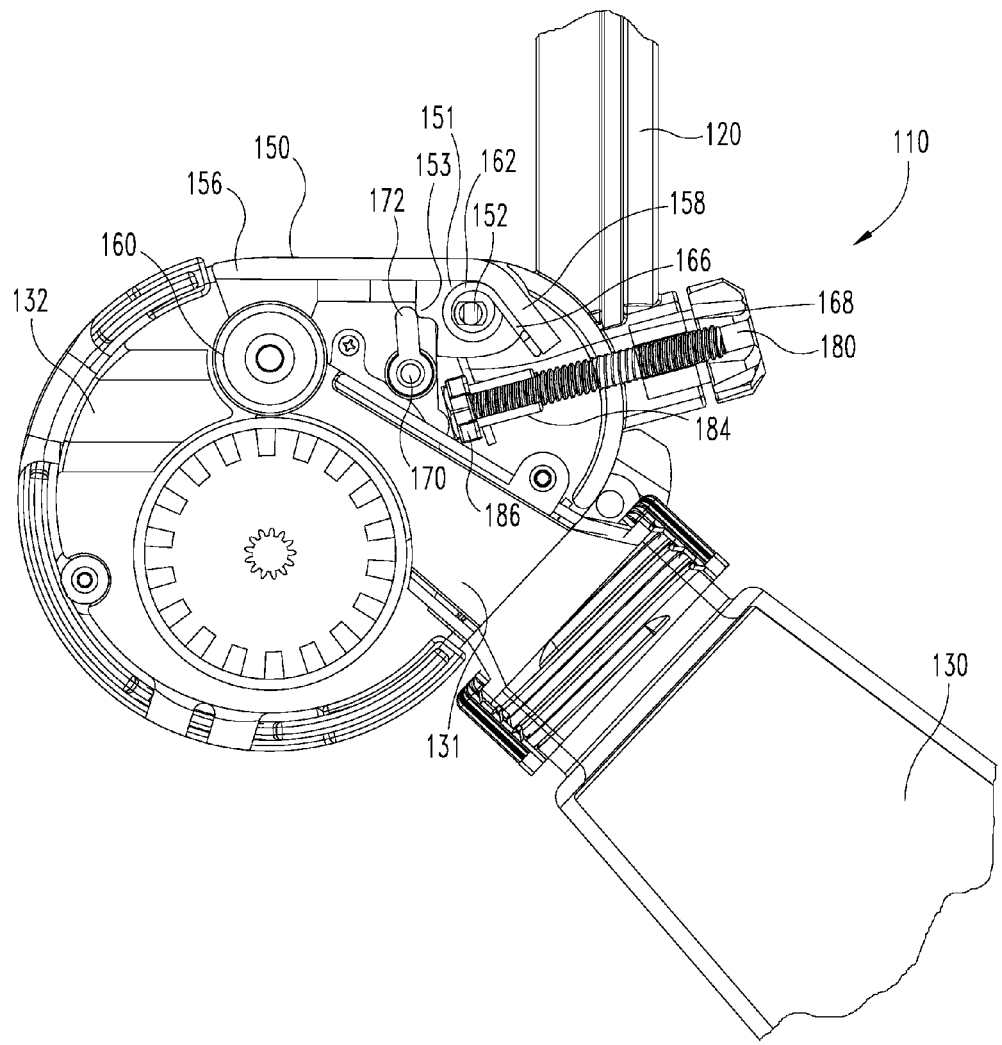
FIG. 9 is a cross-sectional left side interior view of the bowfishing reel lever locking arrangement of FIG. 3.

FIGS. 7-9 illustrate more detailed interior views of the locking lever arrangement for reel assembly 110, with lever 150 shown in the open position in FIG. 7 and in the closed position in FIGS. 8 and 9. FIG. 9 is a cross sectional view for illustration. Lever 150 is pivotally mounted to bracket 120. As illustrated, the central portion of lever 150 has parallel flanges 151 forming a lever base spaced along and around an axle 152. Pinch wheel 160 is rotatably mounted to the forward end 156 of lever 150. The rearward end of lever 150 is within the assembly and is engaged by a lever end 166 of torsion spring 162 with a coiled portion arranged around axle 152. The opposing ends 168 of spring 162 engage a base 184 and spring grooves 186 mounted to a drag adjustment knob 180.

Drag adjustment knob 180 includes a threaded shaft 152 extending through mounting bracket 120 to engage base 184. Spring ends 168 bias base 184 forward and away from knob 180. Spring 162 is preferably biased with lever end 166 and opposing ends 168 biased away from each other to correspondingly urge lever rear end 158 outward and lever 150 into the closed position. Rotating knob 180 and shaft 152 adjusts the depth of base 184 to draw spring ends 168 rearward or to allow them to expand forward. Adjusting knob 180 correspondingly adjusts the tension of spring 168 and the force applied to lever 150. This force preferably biases and maintains lever 150 in the closed position and correspondingly applies a pinching force to the fishing line within the assembly when lever 150 is in the closed position.

Lever 150 can be rotated to an open position by an archer rotating lever button 154 (seen in FIG. 3) which is mounted to an exterior end of axle 152. In certain embodiments, lever button 154 can be rotated by an archer manually, for example using a thumb or finger(s) to rotate the lever button. In alternate embodiments, the lever button can be configured to automatically rotate to an open position as the bow is drawn. Examples of automatic rotation include a cable or similar connection piece extending from a lever end of lever button 154 to the bow's cable arrangement or a cable guard portion (such as a slide, swing arm or roller), such that horizontal movement of the bowstring or a cable guard portion or vertical movement of one of the bow's cross-cables causes the cable or connection to pull on the lever end and to rotate lever button 154 and lever 150 to an open position.

Rotating button 154 counter-clockwise from the perspective illustrated in FIG. 3, rotates lever 150 to the open position, removing the pinching force applied to the fishing line. When lever 150 is rotated to the open position, the lever preferably locks in place to allow the archer to shoot the bow while the line is freely displaceable. Lever 150 preferably switches to the closed position when the archer begins drawings line back through the reel assembly.

In further detail, lever lock 170 is pivotally mounted within the reel assembly. Lever lock spring 176 is mounted between a lower end 174 of lever lock 170 and an interior anchor point such as on the interior side of right cover 124. Lever lock spring 176 preferably biases lever lock 170 to rotate in a clockwise direction from the perspective illustrated in FIG. 8. A locking end 172 of lever lock 170 is operable to bear against lever arm 150 to lock it in the open position. Specifically, the flanges 151 of the lever base define locking notches 153 adjacent to lever lock end 172.

When lever 150 is in the closed position illustrated in FIG. 8, locking notches 153 are disengaged from locking end 172 and the lever lock is in a counter-clockwise position with lever lock spring 176 expanded. When lever 150 is rotated to the open position, illustrated in FIGS. 7 and 9, the clearance below locking notches 153 allows locking end 172 of locking lever 170 to rotate rearward/clockwise, as urged by the pulling force of lever lock spring 176, and below and within locking notches 153. The orientation and engagement of locking end 172 below and within notches 153 prevents lever 150 from returning to the closed position. Lever 150 will then remain locked in the open position until the locking end of lever lock 170 is disengaged from notches 153.

Lever lock 170 is disengaged from notches 153 when the archer begins turning the reel knob 136 and arm 134 to draw the fishing line towards the bow. Specifically, the reel arm 134 is preferably rotated and geared to rotate wheel 140 in a clockwise direction from the prospective of FIGS. 7-9. Tabs or projections 144 extend radially from wheel 140 and bear against the lower end 174 of locking lever 170 when locking lever 170 is in the locked position. As tabs 144 rotate clockwise, they apply force to lower end 174 sufficient to overcome the force applied by lever lock spring 176 and thus rotate lock lever 170 in a counter-clockwise direction. This counter-clockwise rotation disengages lever lock end 172 from lever 150, allowing torsion spring 162 to urge lever 150 into the closed position. Pinch roller 160 then bears against the fishing line and wheel 140 applying friction to the line to enable it to be drawn through the reel assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A bowfishing reel for use with a fishing line, the bowfishing reel comprising:
   a first wheel rotatable about its axis;
   a second wheel movable with respect to the first wheel and rotatable about its axis, wherein said second wheel is constructed and arranged to be moved into contact with said first wheel to pinch the fishing line between said first and second wheels;
   a biasing mechanism constructed and arranged to bias said second wheel toward said first wheel with a biasing force sufficient to grip the fishing line when the fishing line is pinched between said first and second wheels;
   an actuator mechanically coupled to said second wheel constructed and arranged to move said second wheel away from said first wheel against the biasing force of said biasing mechanism;
   a latch constructed and arranged to independently hold and retain said second wheel away from said first wheel against the biasing force of said biasing mechanism; and
   a trigger mechanism constructed and arranged to controllably release said latch from holding said second wheel away from said first wheel; thereby allowing said biasing mechanism to bias said second wheel into contact with said first wheel to pinch the fishing line between said first and second wheels.

2. The bowfishing reel of claim 1, further comprising a reel arm rotationally coupled to said first wheel, wherein rotation of said reel arm rotates said first wheel.

3. The bowfishing reel of claim 2, wherein said first wheel is part of said trigger mechanism such that rotation of said first wheel about its axis, in a direction that retrieves the fishing line, releases said latch from holding said second wheel away from said first wheel.

4. The bowfishing reel of claim 1, wherein said biasing mechanism comprises a spring that produces said biasing force.

5. The bowfishing reel of claim 1, wherein said latch is rotatable about its axis, wherein said actuator further comprises a notch constructed and arranged to receive and hold said latch and wherein said bowfishing reel further comprises a latch spring constructed and arranged to rotate said latch into engagement with said notch.

6. The bowfishing reel of claim 1, further comprising a drag adjustment mechanism that is constructed and arranged to modify the biasing force exerted by said biasing mechanism that biases said second wheel toward said first wheel.

7. The bowfishing reel of claim 6, further comprising a threaded shaft coupled to said biasing mechanism that alters a deflection distance of said biasing mechanism such that the biasing force exerted by said biasing mechanism that biases said second wheel toward said first wheel can be adjusted by rotation of said threaded shaft relative to said bowfishing reel.

8. The bowfishing reel of claim 1, wherein said actuator comprises a button operable by a user's finger to move said second wheel away from said first wheel against the biasing force of said biasing mechanism.

9. The bowfishing reel of claim 1, wherein said actuator comprises an automatic movement mechanism that automatically moves said second wheel away from said first wheel against the biasing force of said biasing mechanism when a bowstring on a bow that the bowfishing reel is attached to is drawn back.

10. A bowfishing reel for use with a fishing line, the bowfishing reel comprising:
    a reel rotatable about its axis;
    a lever body rotatable about its axis;
    a pinch roller rotatable about its axis mounted on said lever body, wherein rotation of said lever body about its axis moves said pinch roller with respect to said reel;
    a biasing mechanism constructed and arranged to bias said lever body such that the pinch roller is biased toward said reel with a biasing force sufficient to pinch and grip the fishing line between the reel and pinch roller;
    a lever lock constructed and arranged to engage said lever body when said pinch roller is not in contact with said reel, wherein said lever lock is constructed and arranged to block rotation of said lever body against the biasing force of said biasing mechanism when engaged with said lever body; and
    a trigger mechanism constructed and arranged to controllably disengage said lever lock from said lever body, thereby allowing said biasing mechanism to rotate said lever body to move the pinch roller to pinch and grip the fishing line between the reel and pinch roller.

11. The bowfishing reel of claim 10, wherein said reel is part of said trigger mechanism such that rotation of said reel about its axis, in a direction that retrieves the fishing line, disengages said lever lock from said lever body.

12. The bowfishing reel of claim 10, further comprising a projection on said reel constructed and arranged to disengage said lever lock from said lever body when said reel is rotated.

13. The bowfishing reel of claim 10, wherein said biasing mechanism comprises a torsion spring that produces said biasing force, said torsion spring comprising a first end and a second end; wherein said first end engages said lever body.

14. The bowfishing reel of claim 13, further comprising a threaded shaft coupled to said second end of said torsion spring, wherein rotation of said threaded shaft with respect to the bowfishing reel alters a deflection distance of said torsion spring such that the biasing force exerted by said torsion spring on said lever body that biases said pinch roller toward said reel is adjusted.

15. The bowfishing reel of claim 10, wherein said lever body further comprises a notch constructed and arranged to receive and hold said lever lock.

16. The bowfishing reel of claim 15, wherein said bowfishing reel further comprises a lever lock spring constructed and arranged to rotate said lever lock into engagement with said notch when said pinch roller is not in contact with said reel.

17. The bowfishing reel of claim 10, further comprising a reel arm rotationally coupled to said reel, wherein rotation of said reel arm rotates said reel about its axis.

18. The bowfishing reel of claim 10, further comprising a lever button operable by a user's finger to rotate said lever body to move said pinch roller away from said reel.

19. A kit comprising:
 a fishing line;
 a fishing arrow including an attachment point for said fishing line;
 a bowfishing reel comprising:
  a reel rotatable about its axis;
  a reel arm rotationally coupled to said reel, wherein rotation of said reel arm rotates said reel about its axis;
  a lever body rotatable about its axis;
  a pinch roller rotatable about its axis mounted on said lever body, wherein rotation of said lever body about its axis moves said pinch roller with respect to said reel;
  a torsion spring comprising a first end and a second end; wherein said first end engages said lever body, wherein said torsion spring is constructed and arranged to bias said lever body such that the pinch roller is biased toward said reel with a biasing force sufficient to pinch and grip said fishing line between the reel and pinch roller;
  a lever button mechanically coupled to said lever body and operable by a user's finger to selectively move said pinch roller away from said reel;
  a lever lock constructed and arranged to independently hold and retain said lever body to maintain the relative position of said pinch roller away from said reel;
  a projection on said reel constructed to disengage said lever lock from said lever body when said reel is rotated; and
 a bottle constructed and arranged to receive said fishing line when said fishing line is retrieved using the bowfishing reel.

20. The kit claim 19, wherein the reel further comprises a threaded shaft coupled to said second end of said torsion spring, wherein rotation of said threaded shaft with respect to the bowfishing reel alters a deflection distance of said torsion spring such that the biasing force exerted by said torsion spring on said lever body that biases said pinch roller toward said reel is adjusted.

* * * * *